United States Patent [19]

Damon

[11] 3,846,740

[45] Nov. 5, 1974

[54] MULTIPLE-PIN PLUG ADAPTOR

[75] Inventor: Neil F. Damon, Cumberland, R.I.

[73] Assignee: Augat Inc., Attleboro, Mass.

[22] Filed: July 17, 1972

[21] Appl. No.: 272,694

[52] U.S. Cl.......... 339/220 R, 206/46 ED, 339/17 C

[51] Int. Cl............................................... H01r 9/08

[58] Field of Search........ 339/220 R, 220 A, 220 C, 339/220 L, 220 T, 17 C, 17 CF, 176 M, 75, 91; 174/DIG. 3, 68.5; 317/101 CC, 101 CD; 206/46 ED, 65 F; 26/13; 24/230 F, 230 SC; 312/111, 108

[56] References Cited

UNITED STATES PATENTS

| | | | |
|---|---|---|---|
| 3,345,541 | 10/1967 | Cobaugh et al. | 317/101 CC |
| 3,471,822 | 10/1969 | Van Baelen | 339/18 R |
| 3,602,874 | 8/1971 | Sarazen | 339/192 R |
| 3,611,250 | 10/1971 | Reed | 339/17 CF |
| 3,644,792 | 2/1972 | Fields | 339/17 C X |
| 3,693,131 | 9/1972 | Klehm | 339/17 CF |
| 3,719,917 | 3/1973 | Fischer et al. | 339/17 CF |

*Primary Examiner*—Paul R. Gilliam
*Assistant Examiner*—Robert A. Hafer
*Attorney, Agent, or Firm*—Weingarten, Maxham & Schurgin

[57] ABSTRACT

A precision insulative component for adapting a conventional cable plug assembly having a plurality of terminal pins arranged in spaced parallel rows for electrical connection with a like plurality of upstanding resilient terminals correspondingly arrayed on a mounting panel. The adaptor includes a generally flat rectangular body having spaced parallel rows of posts integral with the long edges of the body and a plurality of shoulders aligned with the posts and extending laterally from the body to form channels between them to receive the terminal pins of the cable plug assembly.

5 Claims, 6 Drawing Figures

MULTIPLE-PIN PLUG ADAPTOR

FIELD OF THE INVENTION

This invention relates to electrical interconnection apparatus and more particularly concerns a means for adapting a multiple-pin cable plug assembly for connection to a mounting panel having a plurality of conductive terminals projecting therefrom.

DISCUSSION OF THE PRIOR ART

Multiple wire cable has been developed for use in the electronics industry, generally for purposes of making external electrical connections to integrated circuit boards or mounting panels of the type designed to receive dual-in-line electronic circuit packages. A connector has been developed for such a cable to fit in the positions in the circuit board otherwise designed for dual-in-line packages. With circuit boards which are provided with parallel rows of holes to receive the pins of conventional modular electronic circuit packages, such a connector works quite well. However, a recent development in electronic interconnection includes terminal pins having a resilient portion extending from one side of the circuit board and the conventional square pin normally interconnected by wire wrapping extending from the other side of the board. This circuit board configuration had led to the development of cartridges which adapt dual-in-line packages for mounting between the rows of resilient terminals to thereby make multiple electrical circuit connection to the plurality of pins extending from the other side of the board. However, no satisfactory means have previously been provided for connection of the multiple-wire cable to circuit boards having the resilient projecting terminals described above.

It is a primary object of this invention to adapt the already known cable plug assembly for electrical interconnection with the upstanding resilient terminal elements of the type mentioned above which are mounted to circuit boards.

SUMMARY OF THE INVENTION

Adaptor may be inexpensively molded in large quantity in relatively low cost plastic molding dies and is shaped to provide a relatively large "target" insertion area to facilitate coupling to the cable plug. Two parallel rows of individual separated posts extend in one direction from the adaptor body adjacent its long edges and shoulders aligned with the posts project laterally from the opposite long edges of the body to form slots or grooves which extend between the shoulders and the posts. The pins of the cable plug slide around the body within the slots and are normally crimped around the bottom corner of the body portion of the adaptor to form a unitary connector assembly.

In addition to adapting the cable plug for connection with the resilient terminals projecting from mounting boards, this novel adaptor serves to enclose the delicate pins of the cable plug thereby providing complete protection for these pins during shipment or other handling. It may thus be appreciated that multiple-pin cable plugs may now connect to both types of circuit boards, those having parallel rows of holes and those having parallel rows of resilient terminals.

Any type of multiple-pin connector or electronic module may be used with this adaptor and an example other than a cable plug is described herein.

BRIEF DESCRIPTION OF THE DRAWING

The objects, advantages and features of this invention will become more readily apparent from the following detailed description when taken in conjunction with the accompanying drawing in which.

DESCRIPTION OF THE PREFERRED EMBODIMENTS

Figures 1, 2, 3, 4:
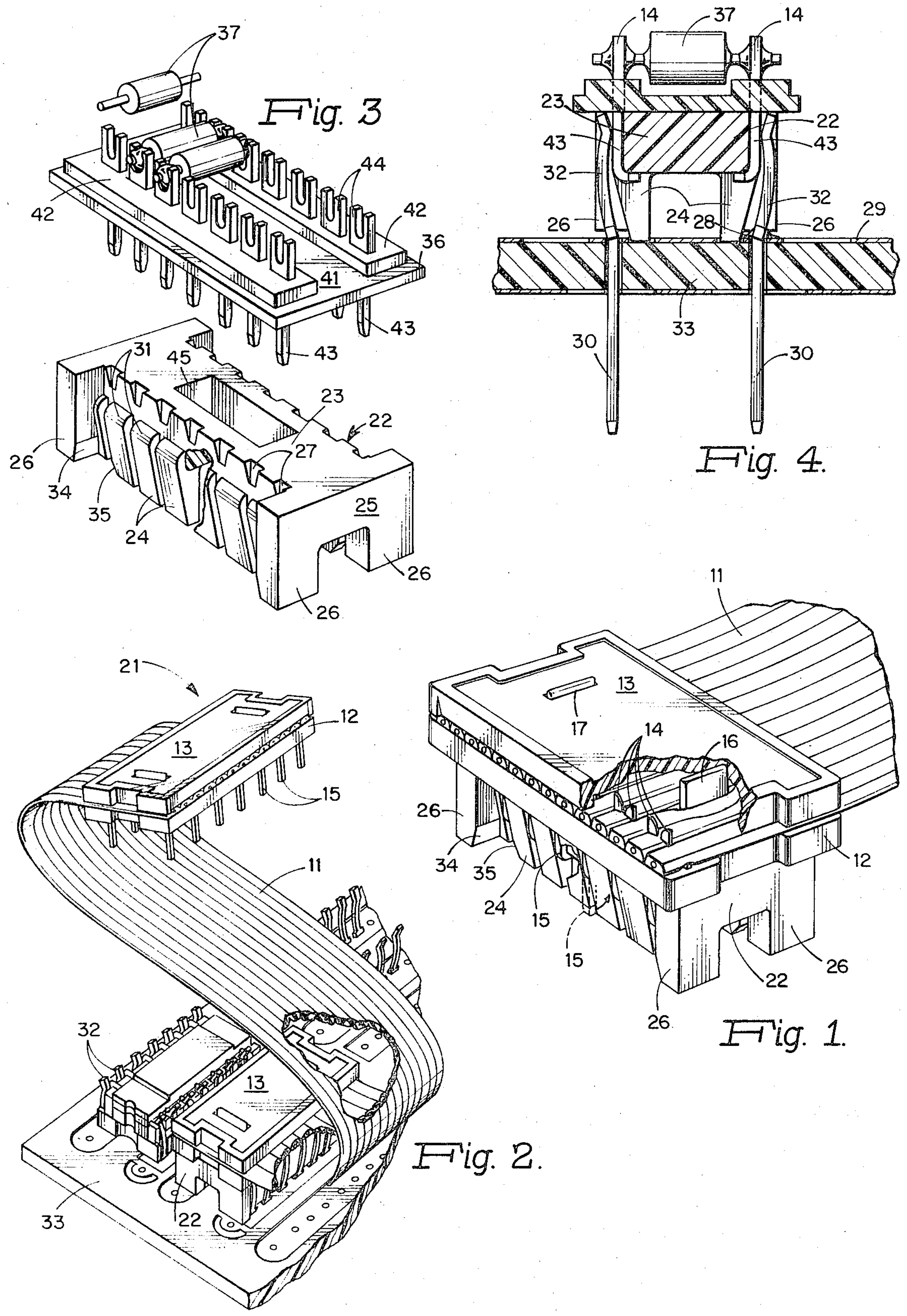
FIG. 1 is a perspective view of a conventional cable plug with attached cable mounted to the adaptor of this invention.
FIG. 2 is a perspective view showing the assembly of FIG. 1 mounted to a panel and further showing the opposite end of the cable with the standard cable plug attached.
FIG. 3 is an exploded perspective of an alternative embodiment of the invention which is designed to permit discrete components to be interconnected between specific pins of the mounting panel.
FIG. 4 is an end view of the embodiment of FIG. 3 mounted to a panel.
Figure 5:
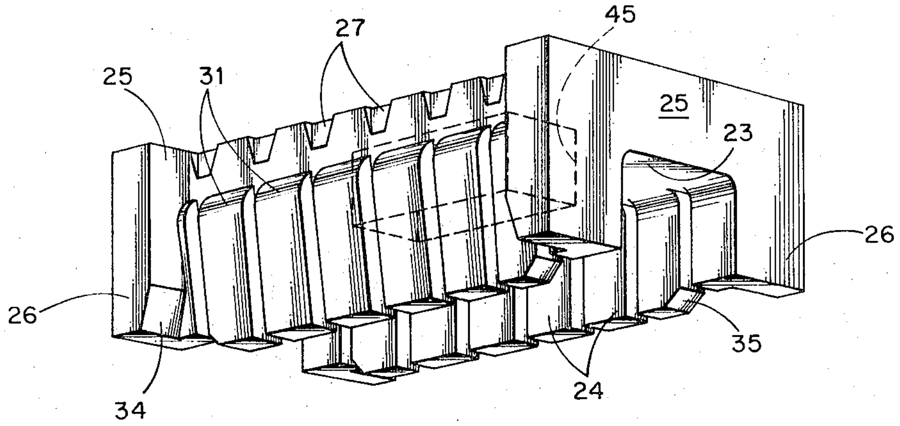
FIG. 5 is a perspective view of the underside of the adaptor of this invention showing further details of the construction thereof.

With reference now to FIG. 1, 2 and 5 there is shown a flat multi-wire cable 11 having one end sandwiched between a plug base 12 and a plug cap 13 to form a conventional cable plug assembly for this type of cable. It may be observed that this plug assembly may be created at any position along the length of the cable, not necessarily at its ends. Plugs having the wires entering at the center of the cap are also in present use. Plug base 12 has a plurality of upstanding connectors 14 arranged in two parallel rows along the length thereof. These connectors are formed integrally with pins 15 which extend from the opposite side of the base. Connectors 14 are quite thin and have sharp points which, when cap 13 and base 12 are squeezed together with cable 11 extending therebetween, slice through the cable insulation and make contact with the individual conductors within the cable. One row of connectors 14 makes contact with alternate conductors of cable 11 while the other row on the other side of base 12 makes contact with the other conductors. Locating tabs 16 project upwardly from base 12 and engage holes 17 in cap 13 for registration purposes. These tabs also project through the cable ribbon between conductors. Cap 13 is formed with slots (not shown) in its underside to receive the ends of connectors 14 which project through and beyond the cable. The structure described above comprises the conventional cable plug assembly 21 shown at one end of cable 11 in FIG. 2. That figure clearly shows the pins 15 extending from the underside of the cable plug assembly in two parallel rows.

The cable plug adaptor 22 forms in accordance with this invention is a small precision molded integral element of durable insulative plastic having a generally flat rectangular body portion 23, a pair of spaced parallel rows of upstanding posts 24 integral with the body and projecting from one side thereof adjacent its opposite long edges, a plurality of shoulders 31 aligned with the posts and U-shaped end members 25 having legs 26. Shoulders 31 are tapered inwardly and downwardly and meet a corresponding taper on the outer surfaces of posts 24 to form a continuous outward facing surface and slots therebetween. Wedge shaped bevels 27 in the top longitudinal corners of the body provide the "target" area for pins 15 when the adaptor is assembled with the plug. Bevels 27 thereby facilitate the connection of cable plug assembly 21 with adaptor 22 in that leads 15 first enter these cut-outs, which are wider at the top than on the sides of the body, and the leads are thereby centered to pass through the slots formed between shoulders 31. The outer top portions of end members 25 serve as guides to ensure that the end pins 15 on plug 21 are indeed directed into the proper slots. When the cable plug assembly and adaptor have been coupled, pins 15 are bent inwardly to thereby firmly engage the sides and part of the bottom of the body of the adaptor. This then forms a complete cable plug adaptor assembly. One pin 15 is shown in dotted outline in FIG. 1 prior to being bent into place.

As shown in FIG. 4, when the adaptor is mounted to a mounting panel 33 between resilient terminals 32 the lower ends of posts 24 rest on the top surface of the mounting panel and maintain the assembly in stable position. Legs 26 of the end members are shorter than posts 24 and do not touch the panel when the assembly is mounted thereon. Each set of terminals 32 has one end terminal which is connected by means of a solder fillet 28 as shown in FIG. 4 to foil 29 of mounting panel 33. Thus legs 26 of the end members are shorter than posts 24 in order to accommodate this raised spot of solder, no matter which end post may be connected to the board foil. Because solder fillet 28 often spreads slightly, end posts 24 of the adaptor are formed with bevels 35 (FIG. 5) to ensure that the adaptor sits on the panel squarely as intended. Terminals 32 extend between shoulders 31 and resiliently bear against pins 15 which are positioned between the shoulders and posts 24. Two parallel rows of terminals thereby firmly engage the assembly and provide positive electrical contact between pins 15 and the wire wrapping post extensions 30 of terminals 32. The inside corners of legs 26 of the end members are formed with bevels 34 to assist in aligning the assembly with the panel-mounted terminals 32. The end members thus serve two functions, to align the pins of plug 21 when mounted to the adaptor, and to align the terminals of the mounting panel when the adaptor assembly is mounted thereto. Additionally, the end members prevent any longitudinal relative motion with respect to the adaptor.

An alternative embodiment is shown in FIGS. 3 and 4 wherein there is provided a presently available connector member 36 which is adapted for connecting discrete components such as capacitors, resistors and coils 37 between two or more terminals of the mounting panel 33. Multiple wire cable may also be coupled to connector 36 by soldering the individual conductors to the terminals of the connector. Connector 36 has a flat rectangular base with two oppositely disposed spaced ridges 42 on one surface thereof. A plurality of electrically conductive terminal members are located in spaced parallel rows and extend through base 41 and ridges 42. Terminal pins 43 project from one side of base 41 and U-shaped brackets 44 extend from the other side. Pins 43 may be crimped around body 23 of adaptor 22 as shown in FIG. 4 in much the same manner as has been previously described for the embodiment of FIG. 1. The U-shaped brackets may receive the terminals of many types of discrete electronic components such as those shown in FIGS. 3 and 4. While the components shown are cylindrical, two-terminal devices it is possible for elements of other shapes and having more than two terminals to be mounted between two or more of the brackets 44. Such elements are normally soldered in position and provide electrical circuit elements as desired between various of the terminals 43. The combination of connector 36 and adaptor 22 forms an assembly which fits between rows of terminals 32 of the type previously described, thereby making the electrical component connections to various of the terminals secured to the mounting panel.

Figure 6:
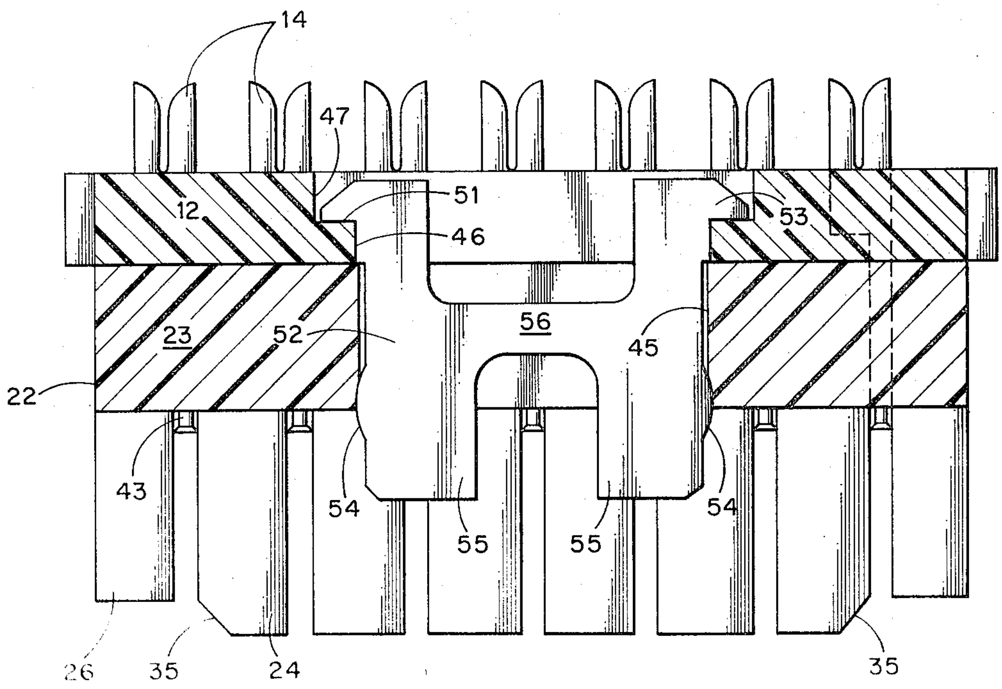
FIG. 6 is a sectional view of a portion of a further alternative embodiment.

A further embodiment is shown in FIG. 6 wherein an H-shaped or "clothes pin" connector 52 is used for assembling cable plug assembly 21 to adaptor 22. As shown in FIGS. 3 and 5, adaptor 22 may be formed with central rectangular opening 45 and plus base 12 is formed with a similar rectangular opening 46 having counter sunk opening 47 forming shoulders 51. The connector 52 has wing type projections 53 at opposite sides of one end for engaging shoulders 51 of plug base 12 and has button projections 54 along the sides of the legs 55 below central bridge member 56. Connector 52 is preferably made of plastic, but other somewhat flexible materials would be suitable. The bottom outside corners of legs 55 are beveled as shown to facilitate entry of the legs through opening 45 in body 23. Because projections 54 are situated below bridge 56, a certain amount of flexing takes place when forces are applied to projections 54. By forming connector 52 with the projections having their extreme outside surfaces separated by a distance which is somewhat greater than the width of opening 45 in body 23 it may be seen how this connector provides a firm and positive attachment of the cable plug assembly to adaptor 22. This connector embodiment would normally be used in the field where the cable plug and adaptor are being assembled by the user and it is not otherwise convenient to crimp pins 15 around body 23.

In view of the above description it is likely that modifications and improvements will occur to those skilled in the art which are within the scope of this invention.

What is claimed is:

1. An insulative adaptor for a multiple-pin plug having parallel rows of terminal pins, said adaptor comprising:

a generally flat rectangular body portion;

a pair of spaced parallel rows of upstanding posts projecting substantially perpendicularly from one side of said body portion and integral therewith, said posts being disposed along said side adjacent opposite parallel edges thereof;

a plurality of spaced shoulders projecting laterally beyond said parallel edges of said body portion and integral therewith, said shoulders being aligned with and substantially equal to the width of said posts, thereby forming a plurality of generally parallel slots between said shoulders; and a pair of U-shaped end members integral with said body portion and having legs substantially parallel with said posts, the sides of said end members extending laterally from said body portion parallel to and farther than said shoulders.

2. The adaptor recited in claim 1 wherein said legs of said end members are shorter than said posts.

3. The adaptor recited in claim 1 wherein said legs of said end members are formed with bevels adjacent their ends on their facing surfaces adjacent said posts.

4. The adaptor recited in claim 2 wherein the end posts in each row are formed with bevels at the ends thereof, said bevels facing said end members.

5. A multiple-pin plug and adaptor assembly comprising:

an insulative adaptor comprising:

a generally flat rectangular body portion having a rectangular opening through the center thereof;

a pair of spaced parallel rows of upstanding posts projecting substantially perpendicularly from one side of said body portion and integral therewith, said posts being disposed along said side adjacent opposite parallel edges thereof; and a plurality of spaced shoulders projecting laterally beyond said parallel edges of said body portion and integral therewith, said shoulders being aligned with and substantially equal to the width of said posts, thereby forming a plurality of generally parallel slots between said shoulders;

a plug having a pair of spaced parallel rows of connector pins projecting therefrom and extending between said shoulders of said adaptor, said plug having a generally flat rectangular body with a countersunk rectangular opening through the center thereof; and a resilient H-shaped connector having wing-like projections engaging said opening in said plug and button projections on the legs of said connector, said connector extending below said plug body into said opening in said adaptor body, said connector flexing sufficiently for said button projections to frictionally engage the walls of said adaptor body opening, thereby securing said plug and adaptor together.

* * * * *

UNITED STATES PATENT OFFICE
CERTIFICATE OF CORRECTION

PATENT NO. : 3,846,740

DATED : November 5, 1974

INVENTOR(S) : Neil F. Damon

It is certified that error appears in the above-identified patent and that said Letters Patent are hereby corrected as shown below:

Column 1, line 29, "had" should read --has--; line 34, "have" should read --has--; line 45, insert before "Adaptor" --This invention comprises a novel adaptor which permits a multiple-pin cable plug assembly to be interconnected with a circuit board having parallel rows of resilient terminals projecting therefrom. A small precision molded integral adaptor of durable insulative plastic is provided which is coupled with the multiple-pin cable plug assembly conventionally mounted to a cable having a plurality of electrical conductors. Cables of this type are normally of flat ribbon-like configuration, but the actual cross-sectional shape is unimportant. This novel--; line 46, change "Adaptor" to --adaptor--. Column 2, line 62, "forms" should read --formed--. Column 4, line 20, "plus" should read --plug--.

Signed and sealed this 6th day of May 1975.

(SEAL)
Attest:

RUTH C. MASON
Attesting Officer

C. MARSHALL DANN
Commissioner of Patents
and Trademarks